United States Patent
Dunstan

(10) Patent No.: US 7,353,413 B2
(45) Date of Patent: Apr. 1, 2008

(54) COMPUTER SYSTEM POWER POLICY ADJUSTMENT IN RESPONSE TO AN AFFIRMATIVE INDICATION FROM A USER

(75) Inventor: Robert A. Dunstan, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 778 days.

(21) Appl. No.: 10/643,475

(22) Filed: Aug. 19, 2003

(65) Prior Publication Data

US 2005/0044241 A1   Feb. 24, 2005

(51) Int. Cl.
*G06F 1/32* (2006.01)

(52) U.S. Cl. ........................ 713/320; 713/310

(58) Field of Classification Search ............... 713/310, 713/320
See application file for complete search history.

(56) References Cited

U.S. PATENT DOCUMENTS

| | | | |
|---|---|---|---|
| 5,396,443 A * | 3/1995 | Mese et al. | 713/321 |
| 5,548,764 A * | 8/1996 | Duley et al. | 713/310 |
| 5,553,296 A * | 9/1996 | Forrest et al. | 713/323 |
| 5,752,044 A | 5/1998 | Crump et al. | |
| 5,875,345 A * | 2/1999 | Naito et al. | 713/323 |
| 6,121,962 A * | 9/2000 | Hwang | 345/211 |
| 6,418,536 B1 * | 7/2002 | Park | 713/323 |
| 6,516,421 B1 * | 2/2003 | Peters | 713/502 |
| 6,665,805 B1 * | 12/2003 | Tsirkel et al. | 713/323 |
| 2001/0037470 A1 | 11/2001 | Teshima et al. | |
| 2002/0056046 A1 | 5/2002 | Klein | |
| 2002/0135474 A1 | 9/2002 | Sylliassen | |
| 2003/0051181 A1 | 3/2003 | Magee et al. | |
| 2003/0058222 A1 | 3/2003 | Casebolt et al. | |
| 2003/0074590 A1 * | 4/2003 | Fogle et al. | 713/320 |

OTHER PUBLICATIONS

"Advanced Configuration and Power Interface Specification Rev. 2.0", Jul. 27, 2000, 481 pages, XP002273950.

\* cited by examiner

*Primary Examiner*—Chun Cao
(74) *Attorney, Agent, or Firm*—Buckley, Maschoff & Talwalkar LLC

(57) ABSTRACT

In some embodiments, a method is provided to receive from a user an affirmative indication via a peripheral device that the user is no longer using a system without powering down a processing unit, and adjust an original power policy of a processing unit in response to the received indication. The system comprises the processing unit and the peripheral device.

13 Claims, 7 Drawing Sheets

COMPUTER SYSTEM POWER POLICY ADJUSTMENT IN RESPONSE TO AN AFFIRMATIVE INDICATION FROM A USER

BACKGROUND

A system, such as a Personal Computer (PC), may enter a low-power state during a period of relative inactivity. For example, a PC might automatically enter a sleep state when not being used in order to reduce power consumption. As a result, energy can be conserved, the PC may operate more quietly (e.g., because a fan might not need to cool a processor), and/or battery life may be extended.

In some cases, the system may automatically enter a sleep state in accordance with a timeout period. For example, a user may configure a power policy such that the system will automatically enter a lower-power state when there has been no keyboard or mouse activity for five minutes (e.g., and thus the user is probably not currently using the system).

DETAILED DESCRIPTION

Some embodiments described here are directed to a "system." As used herein, the term "system" may refer to any apparatus that includes one or more processors. Examples of a system include a desktop PC, a mobile system, a workstation, a server, a set top box (e.g., associated with a digital television receiver), and a game system.

Moreover, some embodiments are associated with a "low-power state," which may refer to any state in which a system consumes less power as compared to a higher-power state. For example, the Advanced Configuration and Power Interface (ACPI) Specification Revision 2.0b (October, 2002) defines a number of low-power states, including a number of sleep states.

Figure 1:
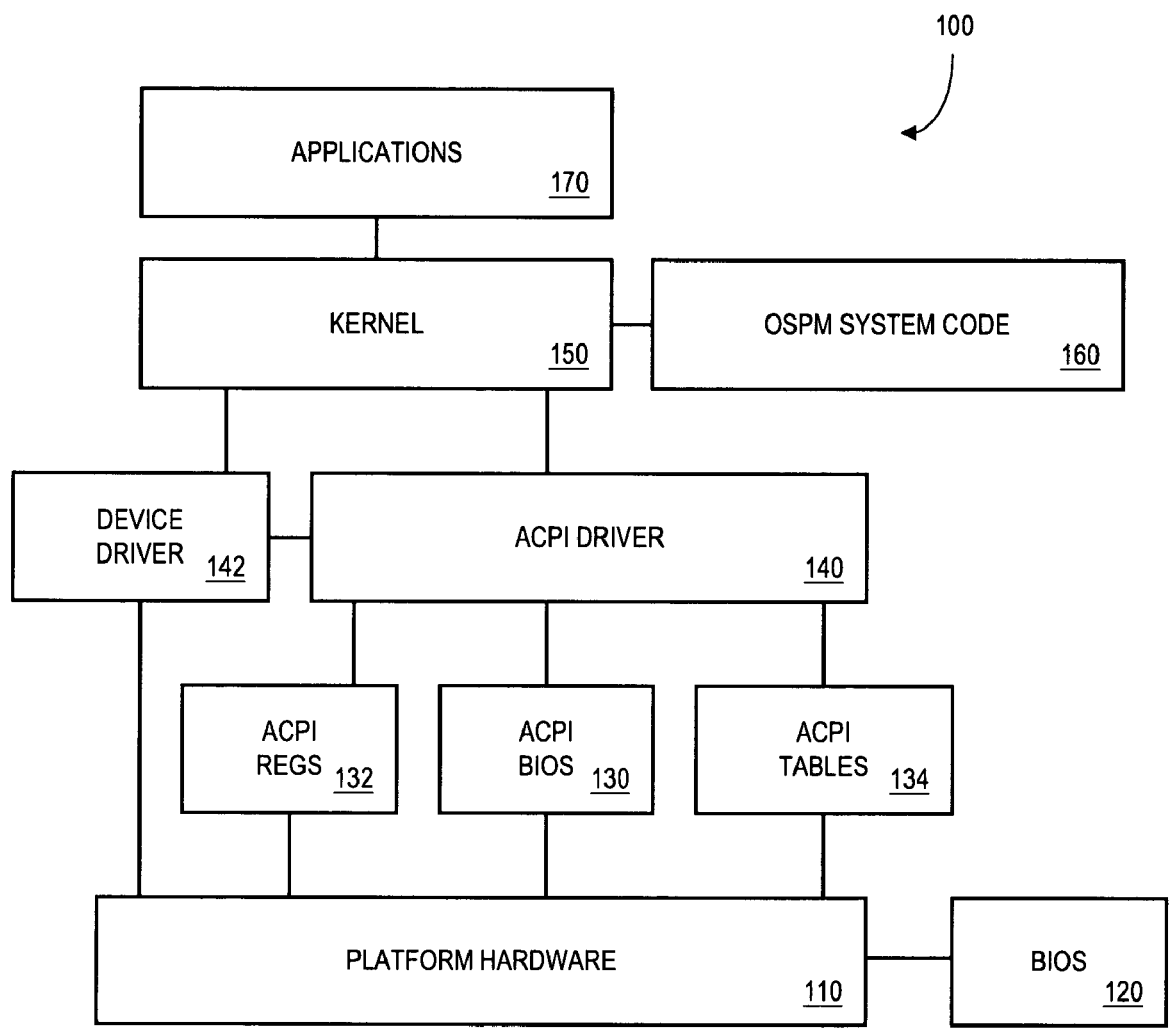
FIG. 1 is a block diagram of hardware and software power management components according to some embodiments.

FIG. 1 is a block diagram of hardware and software power management components that may be associated with an ACPI system 100 according to some embodiments. The system 100 includes platform hardware 110, such as a processor, a motherboard, and related components. The system 100 also includes a Basic Input/Output System (BIOS) 120 that facilitates start-up operations. The platform hardware 110 may exchange information with an ACPI driver 140 via an ACPI BIOS 130, ACPI registers 132, and/or ACPI tables 134 (and these may be part of the BIOS data and contained with the BIOS in the same non-volatile memory element, such as flash memory). The ACPI driver 140 (e.g., an integral part of an operating system) may in turn communicate with an Operating System (OS) kernel 150 and one or more device drivers 142. The kernel 150 may exchange information with OS Power Management (OSPM) code 160 and one or more applications 170 that are executing in the system 100.

To save power, the ACPI system 100 may enter a number of different low-power states during periods of relative inactivity. A low-power state may comprise, for example, a state in which the system 100 consumes an increasingly lower amount of power and application 170 instructions are not being executed by a processor in the platform hardware 110 (e.g., ACPI sleep states S1 or S2). In other low-power states, the system 100 may appear to be "turned off" to a user, such as when in ACPI sleep state S3, also referred to as "suspend to Random Access Memory (RAM)" and ACPI sleep state S4, also referred to as "suspend to disk" or "hibernate."

Figure 2:
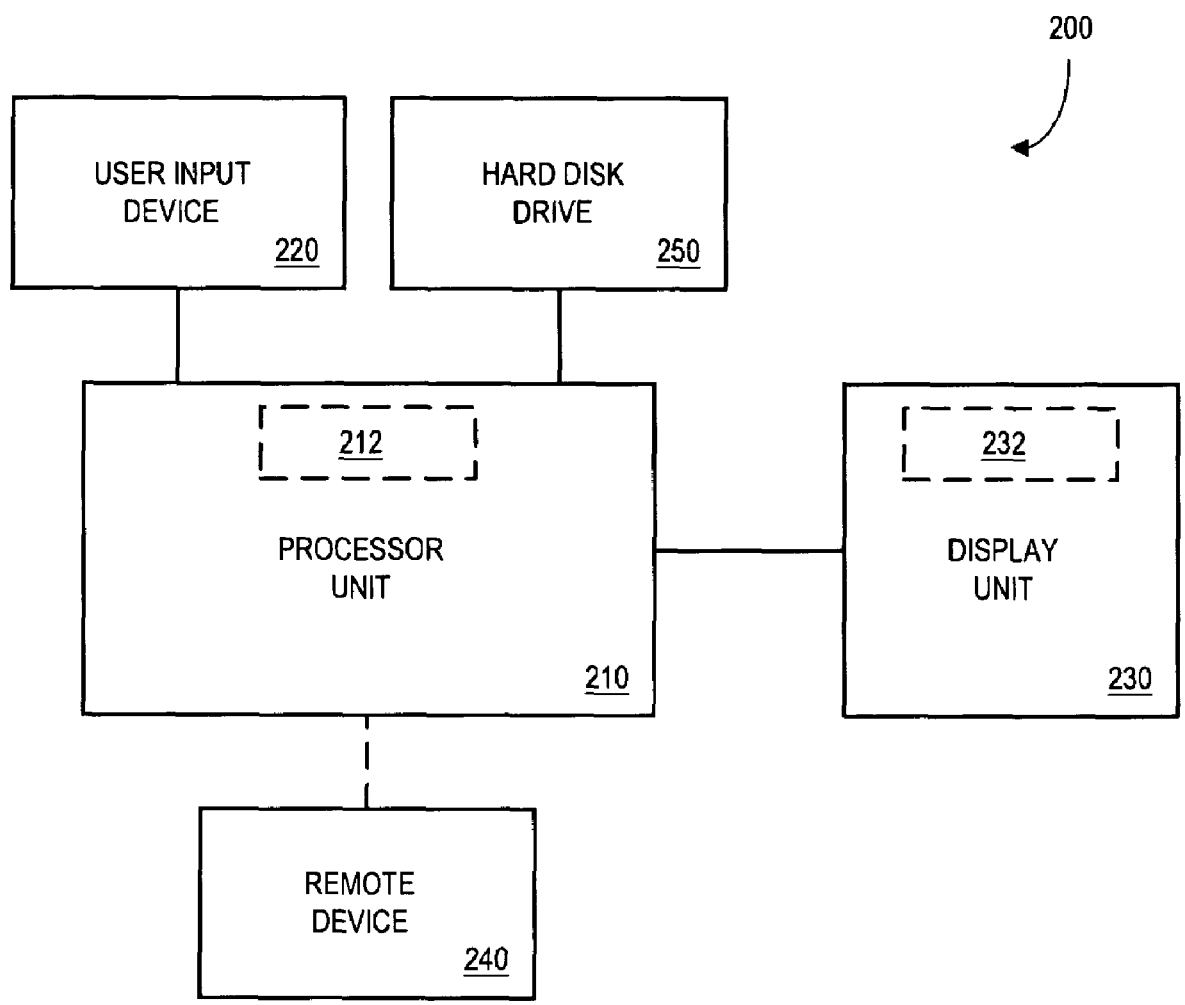
FIG. 2 is a block diagram of a system according to some embodiments.

FIG. 2 is a block diagram of a system 200 according to some embodiments. In particular, a processor unit 210 (e.g., a PC or motherboard) receives information from a user input device 220 (e.g., a keyboard or mouse) and provides information to a display unit 230 (e.g., a display monitor).

The system 200 may be associated with a number of different ACPI low-power states during periods of relative inactivity. For example, the ACPI specification defines global states G0 through G3, device power states D0 through D3, sleep states S0 through S5, processor power states C0 through C3, and device performance states P0 through Pn within D0. Moreover, a power policy associated with the system 200 may define that a low-power state will be automatically entered after a period of inactivity (e.g., if the user has not used a user input device 220 for ten minutes or if a hard disk drive 250 has not been accessed for thirty minutes).

In some cases, the user can provide an affirmative indication that he or she is no longer using the system 200. For example, the user might activate a switch 212 on the processor unit 210 or a button 232 on the display unit 230 to turn off the display unit 230. According to some embodiments, a user may provide such an indication using an Infra-Red (IR) remote control, a keyboard, or an icon displayed on the display unit 230. Even after receiving such an indication, however, the system 200 might still continue to operate in accordance with the original power policy (e.g., the system might not enter a low-power state until after the mouse has not been moved for two minutes). As a result, a fan or other cooling device might remain on ever after the user indicates that he or she is not going to use the system.

Note that it might not be appropriate to have the system 200 enter a low-power state immediately after receiving such an indication from a user. For example, the processor unit 210 might need to continue executing instructions to support one or more remote devices 240 (e.g., a digital television recorder or MP3 stereo device).

Figure 3:
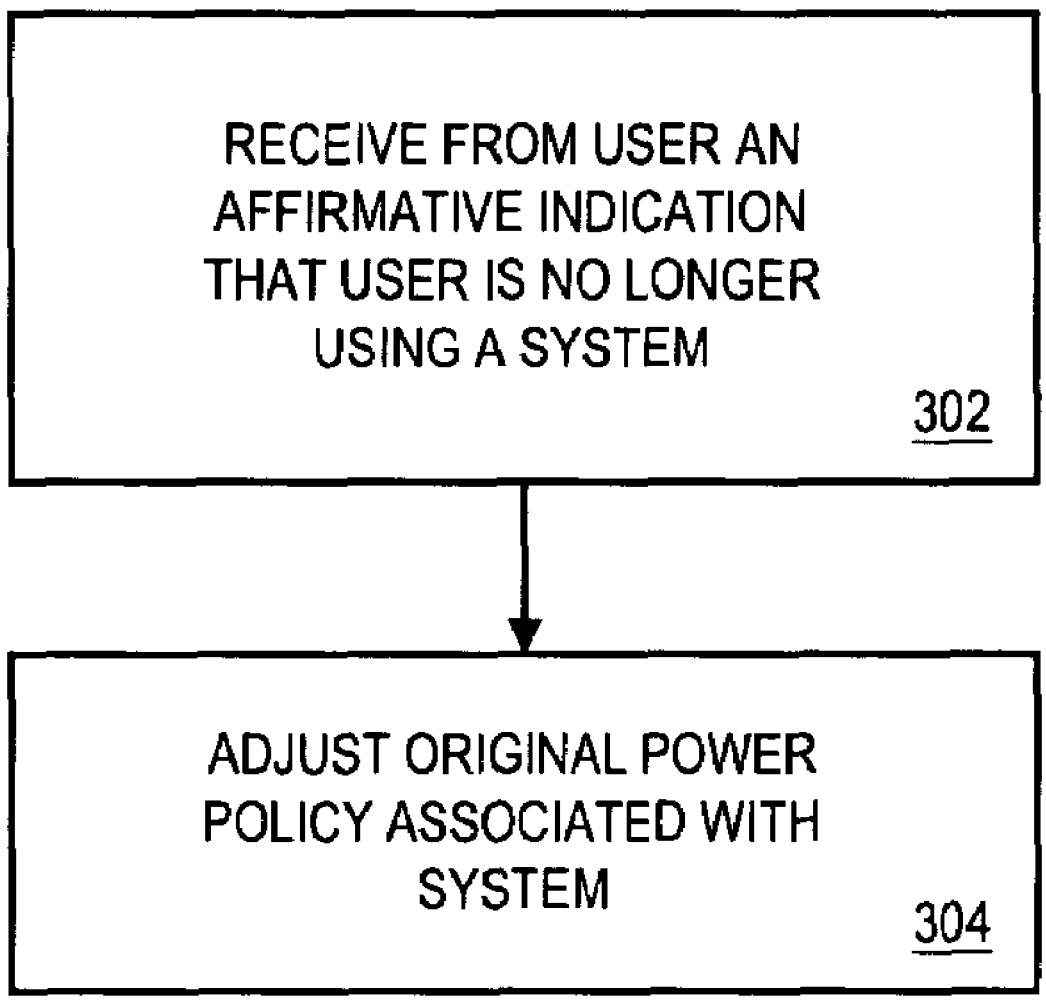
FIG. 3 is a flow chart of a method according to some embodiments.

FIG. 3 is a flow chart of a method according to some embodiments. The method of FIG. 3 may be associated with, for example, a system such as the ones described with respect to FIGS. 1 and/or 2. Note that any of the methods described herein may be performed by hardware, software (including microcode), or a combination of hardware and software. For example, a storage medium may store thereon instructions that when executed by a machine results in performance according to any of the embodiments described herein.

At 302, an indication is received from a user reflecting that the user is no longer using a system. For example, the user might press a button (or select an icon via a graphical user interface) to turn off a display monitor. Since the display is being turned off, it might be assumed that the user is indicating that he or she is no longer going to use the system.

At 304, an original power policy associated with the system is adjusted in response to the received indication. The power policy might, for example, place the system in a low-power state after a pre-determined period of time associated with a keyboard key press, mouse activity (e.g., a mouse movement or click), and/or a device access. Moreover, the power policies might be associated with OS power management policies that are configurable by the user.

Figure 4:
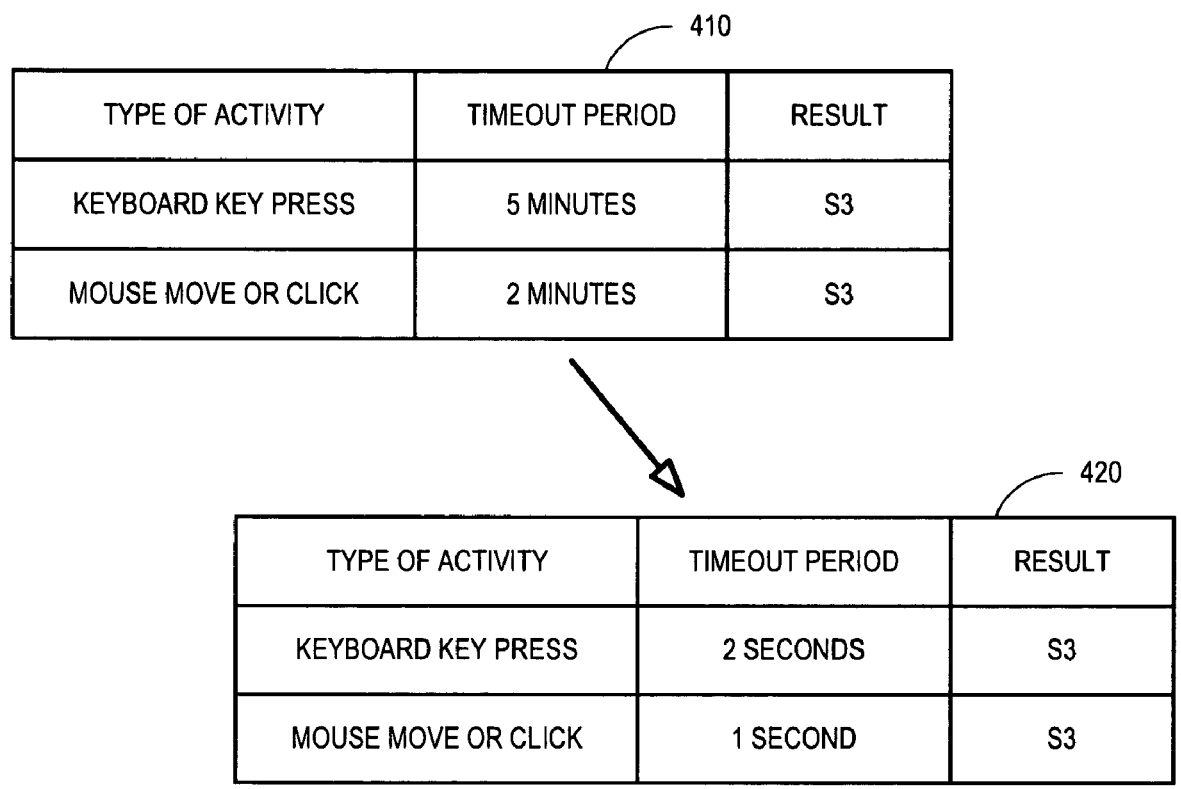
FIG. 4 is an example of power policies according to one embodiment.

By way of example, FIG. 4 includes a set of original power policies 410 according to one embodiment. In particular, each policy indicates a type of activity, a timeout period, and a result. As shown in FIG. 4, the system will enter sleep state S3 if there is no key press for five minutes and no mouse activity for two minutes. Note that the types of activities, timeout periods, and results described with respect to FIG. 4 are for illustration purposes only, and any other type of activity, timeout period, and/or result could instead be used.

FIG. 4 also includes a set of adjusted power policies 410. That is, the timeout periods associated with each power policy have been reduced (e.g., to a lower value). As a result, the system will enter sleep state S3 if there is no key press for two seconds and no mouse activity for one second. That is, since the user is presumably no longer using the system, there is no reason to wait five (or two) minutes before entering ACPI sleep state S3. Also note that if there is other work to be done by the processor (e.g., to support a remote device), OS power management may prevent the system from entering the low-power state even after a period of inactivity.

Figure 5:
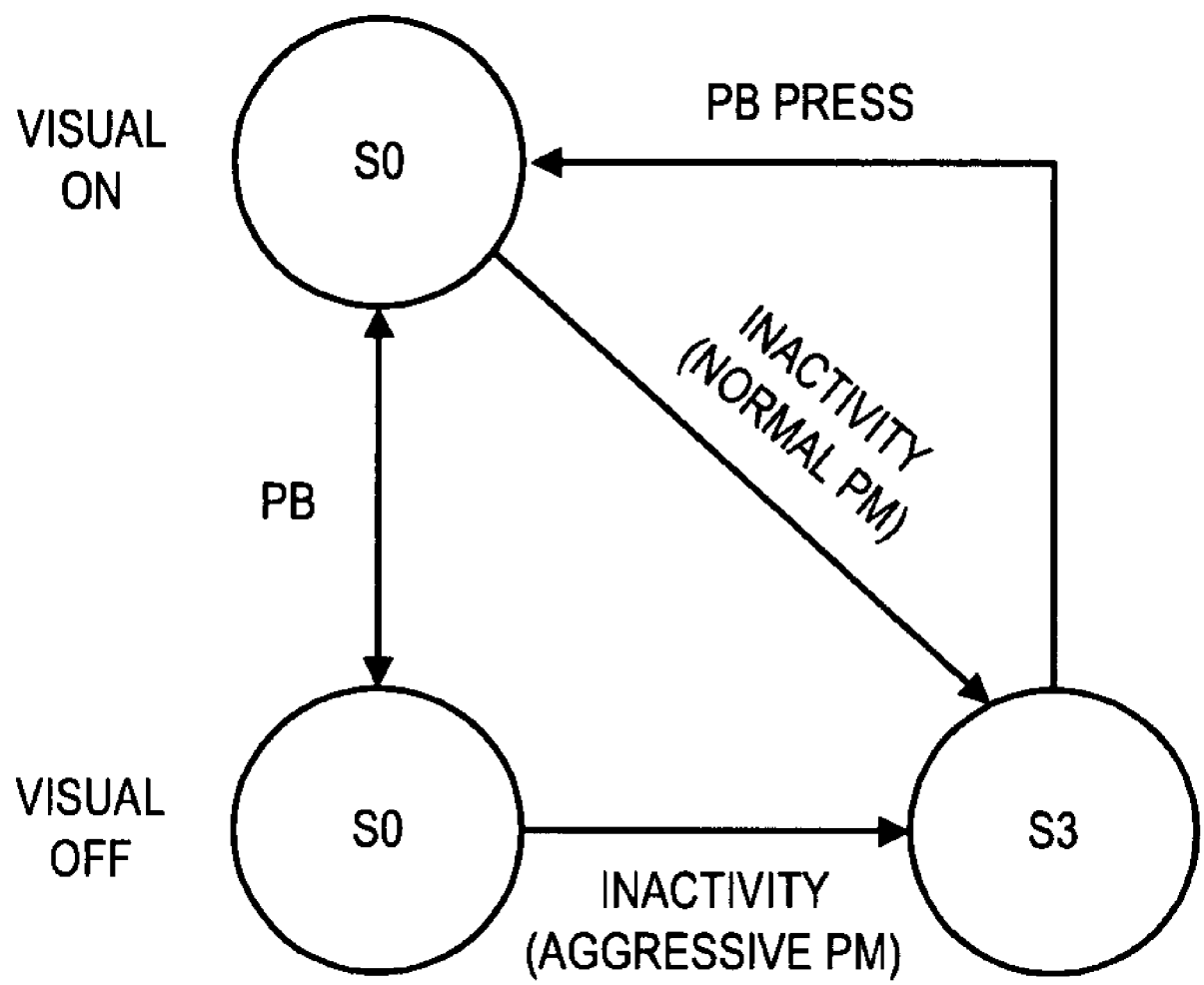
FIG. 5 illustrates one example of power state transitions.

FIG. 5 illustrates one example of power state transitions. In this case, the system may be in one of two ACPI non-sleep states (S0). In the first such state, referred to as "visual on," the system operates as normal. That is, the normal set of Power Management (PM) timeout values will control the automatic transition to ACPI sleep state S3. When a user presses a Power Button (PB), the system transfers to a "visual off" state. The visual off state may be, for example, a state during which the system appears to be off to a user (e.g., the display and speakers are off, the system may not respond to mouse or keyboard activity, and keyboard and power indicators may be off). In this case, the PM timeout values are reduced and the system will aggressively attempt to enter ACPI sleep state S3 (e.g., perhaps after one second). As a result, the system can quickly enter the low-power state and a fan cooling a processor can be turned off (which is what the user might expect when turning off the system). Moreover, OS power management may keep the system out of the state S3 if work needs to be done (e.g., in support of remote devices). Note when the user activates the PB while in state S3 the system may return to the visual on state. Moreover, according to some embodiments the system transitions from the S3 state to the visual off state when a "wake" event occurs (e.g., a modem might receive a ring signal or the system may need to record a television program).

Figure 6:
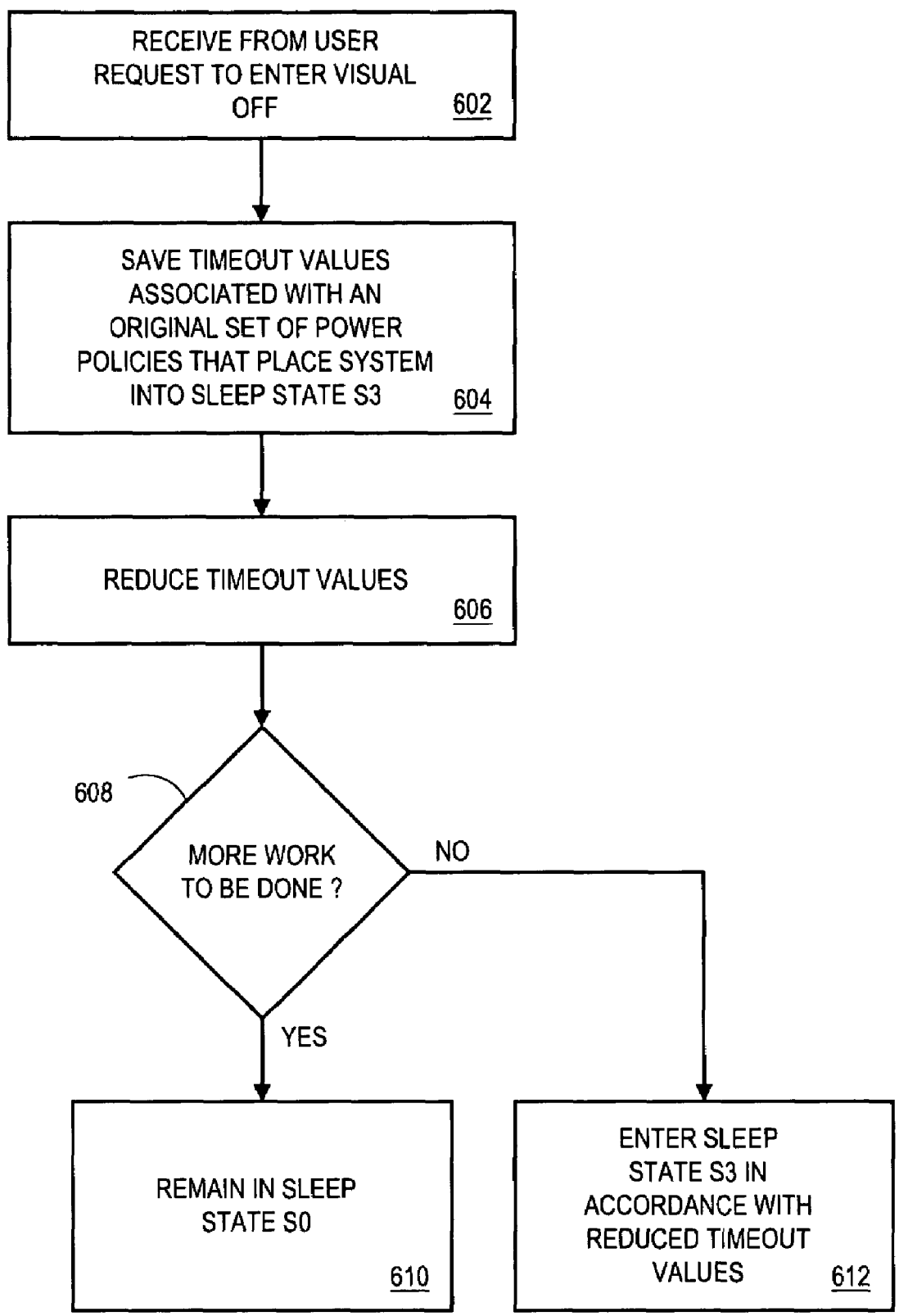
FIG. 6 is a flow chart of a method according to some embodiments.

FIG. 6 is a flow chart of a method according to some embodiments. At 602, a request to enter the visual off state is received from a user. At 604, timeout values associated with an original set of power policies are saved. In particular, these timeout values determine when the system will automatically enter ACPI sleep state S3 (and may have been configured by a user). According to other embodiments, the original timeout values are saved when configured by a user or at any other time (e.g., upon a system power-up).

At 606, the original timeout values are reduced. For example, the timeout values might be reduced to a minimal value. If there is more work to be done by a processor at 608 (e.g., to support a remote device), the system remains in the S0 non-sleep state at 610. If there is no more work to be done, the system enters ACPI sleep state S3 in accordance with the reduced timeout value at 612.

At a later time, the user might indicate that he or she will again use the system (e.g., by requesting to enter the visual on state). In this case, the original timeout values that were saved at 604 can be retrieved and the system can resume normal operation (e.g., in accordance with the power policies configured by the user).

Figure 7:
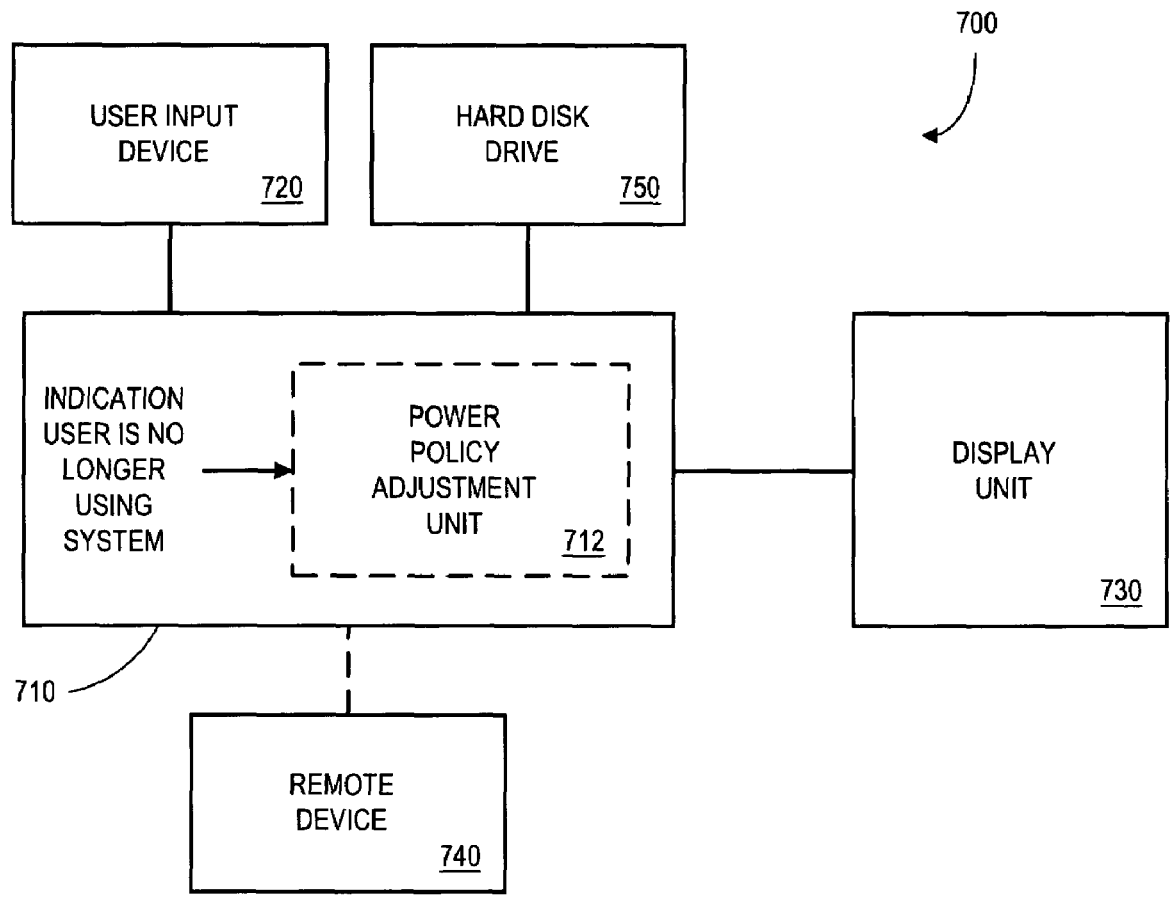
FIG. 7 illustrates a computer system according to some embodiments.

FIG. 7 illustrates a computer system 700 according to some embodiments. In particular, a processor unit 710 (e.g., a PC motherboard) receives information from a user input device 720 (e.g., a keyboard or mouse) and provides information to a display unit 730 (e.g., a display monitor). Moreover, a power policy associated with the system 700 defines that a low-power state will be automatically entered after a period of inactivity (e.g., if the user has not used a user input device 720 or if a hard disk drive 750 has not been accessed for fifteen minutes).

According to this embodiment, a user can provide an affirmative indication that he or she is longer using the system 700. For example, the user might press a button (e.g., associated with the processing system 710, the user input device 720, or the display unit 730) to turn off the display unit 730. Note that it might not be appropriate to have the system 700 enter a low-power state immediately after receiving such an indication from a user (e.g., the processor unit 710 might need to continue executing instructions to support one or more remote devices 740).

A power policy adjustment unit 712 may determine that the indication has been received and automatically adjust one or more power policy timeout values (e.g., by changing a user inactivity timeout value from five minutes to three seconds). As a result, an OS power management unit might quickly establish a low-power state (e.g., ACPI state S3) so that a fan could be turned off soon after the user indicates that he or she is not using the system 700.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although ACPI power states have been used herein as an example, embodiments of the present invention may be associated with any type of low-power state. Moreover, although specific components have been described as performing specific functions, any of the functions described herein might be performed by a software application, a hardware device, an OS, a driver, and/or a BIOS.

The several embodiments described herein are solely for the purpose of illustration. Persons skilled in the art will recognize from this description other embodiments may be practiced with modifications and alterations limited only by the claims.

What is claimed is:

1. A method, comprising:
   establishing a first power policy associated with a system that places the system in a low-power state after a first pre-determined period of time;

receiving from a user an indication that the user is no longer using the system, wherein the indication is sent via a connection with the display unit, and wherein the indication comprises physically turning off the display unit by pressing a button on the display unit; and in response to the indication, establishing a second power policy associated with the system that places the system in the low-power state after a second pre-determined period of time, wherein the second pre-determined time is less than the first pre-determined time.

2. The method of claim 1, further comprising:

continuing, after receiving the indication, to execute instructions to support one or more remote devices prior to establishing the second power policy.

3. The method of claim 1, wherein the low-power state is associated with an advanced configuration and power interface low-power state.

4. The method of claim 3, wherein the low-power state is associated with at least one of: (i) a global state, (ii) a device power state, (iii) a sleep state, (iv) a processor power state, and (v) a performance state.

5. The method of claim 1, further comprising: saving the first power policy.

6. The method of claim 1, further comprising:

receiving from a user a second indication that the user is again using the system, wherein the second indication is received via the connection with the display unit; and establishing the first power policy associated with the system that places the system in the low-power state after the first pre-determined period of time.

7. The method of claim 1, wherein the system includes a processor and comprises at least one of: (i) a desktop personal computer; (ii) a mobile system, (iii) a workstation, (iv) a server, (v) a set top box, and (vi) a game system.

8. The method of claim 1, wherein at least one of said receiving and said establishing is performed by at least one of: (i) a software application, (ii) a hardware device, (iii) an operating system, (iv) a driver, and (v) a basic input/output system.

9. The method of claim 1, wherein the first power policy is configurable by the user.

10. The method of claim 1, wherein the first power policy is associated with operating system power management.

11. An apparatus, comprising:

a processing unit;

an input to receive an indication from a user that the user is no longer using a system, wherein the indication is sent via a connection with the display unit, and wherein the indication comprises physically powering off the display unit by pressing a button on the display unit; and a power policy adjustment unit to establish a first power policy associated with a system that places the system in a low-power state after a first pre-determined period of time, receive from a user an indication via a display unit that the user is no longer using the system, and in response to the indication, establish a second power policy associated with the system that places the system in the low-power state after a second pre-determined period of time, wherein the second pre-determined time is less than the first pre-determined time.

12. An apparatus, comprising:

a storage medium having stored thereon instructions that when executed by a machine result in the following:

establishing a first power policy associated with a system that places the system in a low-power state after a first pre-determined period of time;

receiving from a user an indication that the user is no longer using the system, wherein the indication is sent via a connection with the display unit, and wherein the indication comprises physically turning off the display unit by pressing a button on the display unit; and in response to the indication, establishing a second power policy associated with the system that places the system in the low-power state after a second pre-determined period of time, wherein the second pre-determined time is less than the first pre-determined time.

13. A system, comprising:

a user display unit control input to receive a request to turn off a display unit associated with the system; and an apparatus, including:

a processing unit;

an input to receive an indication from a user that the user is no longer using a system, wherein the indication is sent via a connection with the display unit, and wherein the indication comprises physically turning off the display unit by pressing a button on the display unit; and a power policy adjustment unit to establish a first power policy associated with a system that places the system in a low-power state after a first pre-determined period of time, receive from a user an indication via a display unit that the user is no longer using the system, and in response to the indication, establish a second power policy associated with the system that places the system in the low-power state after a second pre-determined period of time, wherein the second pre-determined time is less than the first pre-determined time.

\* \* \* \* \*